United States Patent
Nehmsmann et al.

[11] Patent Number: 5,804,293
[45] Date of Patent: Sep. 8, 1998

[54] COATING COMPOSITION FOR RECORDING PAPER

[75] Inventors: Louis J. Nehmsmann, Apollo; George E. Alderfer, Export; Charles T. Hill, New Brighton, all of Pa.

[73] Assignee: PPG Industries, Inc., Pittsburgh, Pa.

[21] Appl. No.: 569,619

[22] Filed: Dec. 8, 1995

[51] Int. Cl.⁶ .................. B32B 5/16; B32B 3/26
[52] U.S. Cl. .................. 428/307.3; 428/315.5; 428/319.3; 428/331; 428/339; 428/342
[58] Field of Search ................ 428/323, 331, 428/339, 341, 342, 307.3, 315.5, 319.3

[56] References Cited

U.S. PATENT DOCUMENTS

| | | | |
|---|---|---|---|
| 4,435,004 | 3/1984 | Shanton | 282/27.5 |
| 4,478,910 | 10/1984 | Oshima et al. | 428/331 |
| 4,708,859 | 11/1987 | Chevallier | 423/339 |
| 4,874,594 | 10/1989 | Chevallier | 423/335 |
| 5,089,554 | 2/1992 | Bomo et al. | 524/493 |
| 5,094,829 | 3/1992 | Krivak et al. | 423/339 |
| 5,521,002 | 5/1996 | Sneed | 428/331 |
| 5,605,750 | 2/1997 | Romano et al. | 428/304.4 |

FOREIGN PATENT DOCUMENTS

| | | |
|---|---|---|
| 3-268992 | 11/1991 | Japan . |
| 3-281283 | 12/1991 | Japan . |
| 4-016379 | 1/1992 | Japan . |

OTHER PUBLICATIONS

Abstracts for JP 03[1991]–268992, JP 03[1991]–281283 and JP 04[1992]–016379.

Arnold Storeck, "Color Brilliance & Image Resolution: Synthetic Silicas in Imaging Media" Imaging Materials Seminar (Feb. 20–23, 1994).

*Primary Examiner*—H. Thile
*Attorney, Agent, or Firm*—George D. Morris

[57] ABSTRACT

Printed matter of high optical density may be obtained by ink-jet printing techniques when the coating contains composite particulate amorphous precipitated silica having a calculated multimodal particle size distribution wherein the particle sizes at the modes are less than 10 micrometers.

6 Claims, 3 Drawing Sheets

San-Sil® 2000 Precipitated Silica

Micronized San-Sil® 2000 Precipitated Silica

Fig. 3

20% Hi-Sil® T700 Precipitated Silica and 80% San-Sil® 2000 Precipitated Silica

COATING COMPOSITION FOR RECORDING PAPER

BACKGROUND OF THE INVENTION

Ink-jet printing has become an important printing technique. It produces little noise and can be used to print single color images or multicolor images. In practicing this technique, small droplets of ink are projected in an organized fashion onto a printing substrate to form indicia on the substrate. The definition that can be obtained is dependent upon the print engine, the ink composition, and the nature of the substrate. High definition requires that migration of the ink from the, region of ink deposition be minimized. For many applications, paper is the printing substrate of choice. Plain paper or paper having a low degree of sizing can be used as the printing substrate, but these suffer from the disadvantage that a clear image cannot be obtained because of the diffusion of the ink into the paper. More particularly, the image lacks sharp resolution, and in the case of color printing, the image lacks good optical density.

In order to achieve ink-jet printed images of improved quality, coated papers have been employed as the printing substrates. The image quality varies depending upon the type of coating employed. In most instances image quality is better than that obtained using uncoated paper, but it is still less than desired. Coating compositions containing amorphous precipitated silica have been used. Coatings from these coating compositions have reduced ink migration, but they have also provide printed matter, especially multi-colored printed matter, of low optical density.

SUMMARY OF THE INVENTION

It has now been discovered that printed matter of high optical density may be obtained by ink-jet printing techniques when the coating contains composite particulate amorphous precipitated silica having a calculated multimodal particle size distribution wherein the particle sizes at the modes are less than 10 micrometers.

Accordingly, a first embodiment of the invention is composite particulate amorphous precipitated silica having a calculated multimodal particle size distribution wherein the particle sizes at the modes (viz., the maxima) are less than 10 micrometers.

A second embodiment of the invention is a coating composition comprising (a) composite particulate amorphous precipitated silica having a calculated multimodal particle size distribution wherein the particle sizes at the modes are less than 10 micrometers, (b) aqueous solvent, and (c) water-soluble organic polymeric binder dissolved in the aqueous solvent.

A third embodiment of the invention is a composition comprising (a) composite particulate amorphous precipitated silica having a calculated multimodal particle size distribution wherein the particle sizes at the modes are less than 10 micrometers, and (b) water-soluble organic polymeric binder.

A fourth embodiment of the invention is coated paper comprising a paper substrate having a coating on at least one side thereof wherein the coating comprises (a) composite particulate amorphous precipitated silica having a calculated multimodal particle size distribution wherein the particle sizes at the modes are less than 10 micrometers, and (b) water-soluble organic polymeric binder.

BRIEF DESCRIPTION OF THE DRAWINGS

For a better understanding of the invention, reference may be made to the drawings in which FIGS. 1–3 show particle size distribution histograms of various constituent particulate amorphous precipitated silicas, and in which

DETAILED DESCRIPTION OF THE INVENTION

As used herein, particle sizes and particle size distributions are determined by use of a Multisizer II Coulter counter (Coulter Electronics, Inc.) according to ASTM C 690-86 but modified by stirring the amorphous precipitated silica for 10 minutes in Isoton® II electrolyte (Curtin Matheson Scientific, Inc.) using a four blade, 4.5 centimeter diameter propeller stirrer. The Full Range setting was used and the Pulse Edit feature was not enabled. When particle sizes and particle size distributions are determined for several samples of the same particulate amorphous precipitated silica, the modes will not change much, but the noise will change significantly. In this way true modes can be distinguished from the statistical scatter (viz., noise) inherent in histograms produced by statistical methods.

Many different amorphous precipitated silicas are known and have been used in a wide variety of applications. Amorphous precipitated silicas are most commonly produced by precipitation from an aqueous solution of sodium silicate using a suitable acid such as sulfuric acid, hydrochloric acid, and/or carbon dioxide. Processes for producing amorphous precipitated silicas and the properties of the products are described in detail in U.S. Pat. Nos. 2,657,149; 2,940,830; 4,495,167, 4,681,750, and 5,094,829. Reinforced amorphous precipitated silica is preferred. The reinforced amorphous precipitated silicas described in U.S. Pat. No. 5,094,829 are especially preferred. One such reinforced amorphous precipitated silica is San-Sil® 2000 reinforced amorphous precipitated silica (PPG Industries, Inc., Pittsburgh, Pa.).

Although both are silicas, it is important to distinguish amorphous precipitated silica from silica gel inasmuch as these different materials have different properties. Reference in this regard is made to R. K. Iler, *The Chemistry of Silica*, John Wiley & Sons, New York (1979), Library of Congress Catalog No. QD181.S6144. Note especially pages 15–29, 172–176, 218–233, 364–365, 462–465, 554–564, and 578–579.

Silica gel is usually produced commercially at low pH by acidifying an aqueous solution of a soluble metal silicate, customarily sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used.

Amorphous precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and/or carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Amorphous precipitated silica, then, may be described as precipitated aggregates of ultimate particles of colloidal amorphous silica that have not at any point existed as macroscopic gel during the preparation. The sizes of the aggregates and the degree of hydration may vary widely.

Amorphous precipitated silica powders differ from silica gels that have been pulverized in ordinarily having a more open structure, that is, a higher specific pore volume. However, the specific surface area of precipitated silica as measured by the Brunauer, Emmett, Teller (BET) method using nitrogen as the adsorbate, is often lower than that of silica gel.

In many instances size reduction of amorphous precipitated silica is desired. This has been accomplished by many techniques including crushing, grinding, and milling. Preferably size reduction is accomplished in a fluid energy mill.

Fluid energy mills are themselves well known. See, for example, *Perry's Chemical Engineers' Handbook,* 4th Edition McGraw-Hill Book Company, New York, (1963), Library of Congress Catalog Card Number 6113168, pages 8–42 and 8–43; McCabe and Smith, *Unit Operations of Chemical Engineering,* 3rd Edition, McGraw-Hill Book Company, New York (1976), ISBN 0-07-044825-6, pages 844 and 845; F. E. Albus, "The Modern Fluid Energy Mill", *Chemical Engineering Progress,* Volume 60, No. 6 (June 1964), pages 102–106, the entire disclosures of which are incorporated herein by reference. In fluid energy mills the solid particles are suspended in a gas stream and conveyed at high velocity in a circular or elliptical path. Some reduction occurs when the particles strike or rub against the walls of the confining chamber, but most of the reduction is believed to be caused by interparticle attrition.

The working gas may be a single gas or it may be a mixture of gases. Examples of suitable working gases include air, nitrogen, carbon dioxide, argon, helium, superheated steam, and mixtures of at least two such gases. In most cases the working gas is usually hot air or superheated steam.

The temperature of the working gas may vary widely. The temperatures chosen depend upon the identity of the hydrophobizing agent used and the temperature at which the heat setting reaction will occur. Usually the temperature of the working gas is in the range of from 100° C. to 350° C. In many cases the temperature of the working gas is in the range of from 150° C. to 320° C. Temperatures in the range of from 200° C. to 280° C. are preferred.

The water content of the precipitated silica should be low enough that the amorphous precipitated silica can be introduced to the fluid energy mill. Consequently, if the water content is too high, the material may be dried prior to introduction to the fluid energy mill. Drying, when employed, is usually performed until the precipitated silica is substantially dry.

As produced, particulate amorphous precipitated silica usually has a unimodal particle size distribution. Therefore the composite particulate amorphous precipitated silica as is present in the coating compositions of the present invention has a calculated multimodal particle size distribution and is a mixture of a two or more constituent particulate amorphous precipitated silicas, each having a unimodal particle size distribution in which the particle size at its mode is less than 10 micrometers and is different from the particle size at the mode of other constituent particulate amorphous precipitated silica(s). The difference between the particle sizes at the modes is more than trivial. Usually the difference between the particle sizes at the modes is least 1 micrometer. Often the difference between the particle sizes at the modes is least 2 micrometers. A difference of at least 3 micrometers is preferred. In most instances the difference between the particle sizes at the modes is in the range of from 1 to 9 micrometers. Frequently the difference between the particle sizes at the modes is in the range of from 2 to 8 micrometers. From 2 to 6 micrometers is preferred.

The calculated particle size distribution histograms for composite silicas are plotted using substantially the same class boundaries as the used in the particle size distribution histograms of the constituent silicas and using class ordinates determined by:

$$y_j = \sum_{i=1}^{n} f_i y_{i,j}$$

in which:
i=the constituent silica; i=1, 2, . . . , n;
j=the identification number of the class, i.e., the identification number of rectangles of the particle size distribution histograms having substantially the same class boundaries; j=1, 2, 3, . . . ;
n=the total number of constituent silicas constituting the composite silica;
$y_j$=the ordinate of the $j^{th}$ class for the calculated particle size distribution histogram;
$f_i$=the weight fraction of the $i^{th}$ constituent silica constituting the composite silica;
$y_{i,j}$=the ordinate of the $j^{th}$ class for the $i^{th}$ constituent silica.

In the histograms, whether measured or calculated, the particle size of a class is the particle diameter of the right edge of that class. Since the aperture tube used is chosen to accommodate the largest particles that the sample will contain, different aperture tubes are often used to measure individual silicas which are admixed to form a composite silica. For a fine silica such as micronized San-Sil® 2000 silica and Hi-Sil® T700 silica, a 30 micrometer aperture tube is chosen. For coarser materials such as San-Sil® 2000 silica a 50 micrometer aperture tube is chosen although the lower end of the particle size distribution is sacrificed. Using different aperture tubes causes the sizes of the corresponding classes to differ slightly. The differences, however, are small and insignificant, usually amounting to less than 0.06 micrometer. Any of the sizes of the corresponding classes of the measured histograms may be taken as the size of the corresponding class of the calculated histogram without adversely affecting the overall result.

As earlier stated, the calculated particle size distribution of the composite particulate amorphous precipitated silica in the present invention is multimodal. In many instances, however, the particle size distribution of the composite particulate amorphous precipitated silica as measured by a Coulter counter either does not evidence a multimodal distribution or it shows a much less pronounced multimodal distribution. It is surprising that the calculated particle size distribution is usually a better parameter for prediction of beneficial coating properties than the measured particle size distribution.

Usually the calculated particle size distribution is bimodal, although in many instances it may be characterized by three (trimodal distribution), four (tetramodal distribution), or more modes.

It is convenient, although not necessary, for two or more of the constituent amorphous precipitated silicas to be of the same type except that one amorphous precipitated silica is not subjected to size reduction or is reduced in size to a lesser degree than any other amorphous precipitated silica of the same type. When two or more amorphous precipitated silicas of the same type are subjected to size reduction, they are reduced in size to differing degrees. Amorphous precipitated silicas are of the same type when they are from the same batch or when they are produced by substantially the same process under substantially the same conditions.

The surface area of the amorphous precipitated silica is susceptible to very wide variation. Often the particulate amorphous precipitated silica, whether having a unimodal or multimodal particle size distribution, has a surface area on a coating-free and impregnant-free basis of from 50 to 600 square meters per gram. Frequently the amorphous precipitated silica has a surface area of from 150 to 450 square meters per gram. Preferably the silica has a surface area on a coating-free and impregnant-free basis of from 220 to 270 square meters per gram.

The pore diameter at the maximum of the volume pore size distribution function may similarly vary widely. In most instances the pore diameter at the maximum of the volume pore size distribution function on a coating-free and impregnant-free basis, whether having a unimodal or multimodal particle size distribution, is from 7 to 100 nanometers. Often the pore diameter at the maximum of the volume pore size distribution function on a coating-free and impregnant-free basis is from 9 to 60 nanometers. Preferably the amorphous precipitated silica has a pore diameter at the maximum of the volume pore size distribution function on a coating-free and impregnant-free basis, of from 13 to 18 nanometers.

The total intruded volume may likewise vary considerably. Often the total intruded volume of the amorphous precipitated silica on a coating-free and impregnant-free basis, whether having a unimodal or multimodal particle size distribution, is from 0.5 to 5 cubic centimeters per gram. In many instances the total intruded volume of the amorphous precipitated silica on a coating-free and impregnant-free basis, whether having a unimodal or multimodal particle size distribution, is from 1.5 to 4.7 cubic centimeters per gram. The total intruded volume on a coating-free and impregnant-free basis is preferably from 3 to 4.4 cubic centimeters per gram.

The surface area of the amorphous precipitated silica is the surface area determined by the Brunauer, Emmett, Teller (BET) method according to ASTM C 819-77 using nitrogen as the adsorbate but modified by outgassing the system and the sample for one hour at 180° C.

The volume average pore size distribution function of the amorphous precipitated silica is determined by mercury porosimetry using an Autoscan mercury porosimeter (Quantachrome Corp.) in accordance with the accompanying operating manual. In operating the porosimeter, a scan is made in the high pressure range (from about 103 kilopascals absolute to about 227 megapascals absolute). The volume pore size distribution function is given by the following equation:

$$D_v(d) = \frac{P}{d} \frac{dV}{dP}$$

where:
D$_v$(d) is the volume pore size distribution function, expressed in cm$^3$/(nm.g);
d is the pore diameter, expressed in nm;
P is the pressure, usually expressed in pounds per square inch, absolute; and
V is the pore volume per unit mass, usually expressed in cm$^3$/g.

Where the data are continuous or substantially continuous (i.e., small intervals between successive values of P), Dv(d) is determined by taking ΔV/ΔP for small values of ΔP from either a plot of V versus P or preferably from the raw data. Each value of ΔV/ΔP is multiplied by the pressure at the upper end of the interval and divided by the corresponding pore diameter. The resulting value is plotted versus the pore diameter. The value of the pore diameter at the maximum of the volume pore size distribution function is then taken from the plotted graph. Numerical procedures or other graphical procedures for estimating dV/dP may be used when desired or when necessary due to large intervals between successive values of P.

The total intruded volume is the total volume of mercury which is intruded into the amorphous precipitated silica during the high pressure scan described above divided by the mass of the amorphous precipitated silica constituting the sample under test.

Desirably, but not necessarily, at least one of the constituent particulate amorphous precipitated silicas is reinforced amorphous precipitated silica. It is preferred that all of the constituent particulate amorphous precipitated silicas be reinforced amorphous precipitated silicas. It is especially preferred that all of the constituent particulate reinforced amorphous precipitated silicas be of the same type.

In many instances the particulate reinforced amorphous precipitated silica, whether having a unimodal or multimodal particle size distribution, has a surface area on a coating-free and impregnant-free basis of from 220 to 340 square meters per gram, a pore diameter at the maximum of the volume pore size distribution function on a coating-free and impregnant-free basis of from 9 to 20 nanometers, and a total intruded volume on a coating-free and impregnant-free basis of from 2.6 to 4.4 cubic centimeters per gram. Often the particulate reinforced amorphous precipitated silica has a surface area on a coating-free and impregnant-free basis of from 220 to 1300 square meters per gram. Preferably the particulate reinforced silica has a surface area on a coating-free and impregnant-free basis of from 220 to 270 square meters per gram. Also preferably the particulate reinforced amorphous precipitated silica has a pore diameter at the maximum of the volume pore size distribution function on a coating-free and impregnant-free basis of from 13 to 18 nanometers. Similarly, the total intruded volume on a coating-free and impregnant-free basis is preferably from 3 to 4.4 cubic centimeters per gram. Such particulate reinforced amorphous precipitated silicas and their preparation are described in U.S. Pat. No. 5,094,829.

Figure 1:
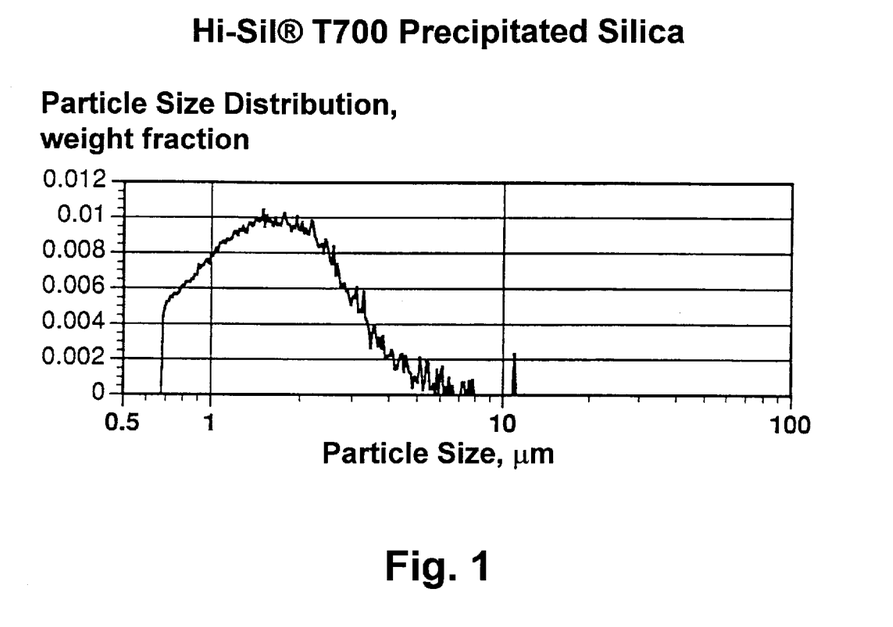
Figure 2:
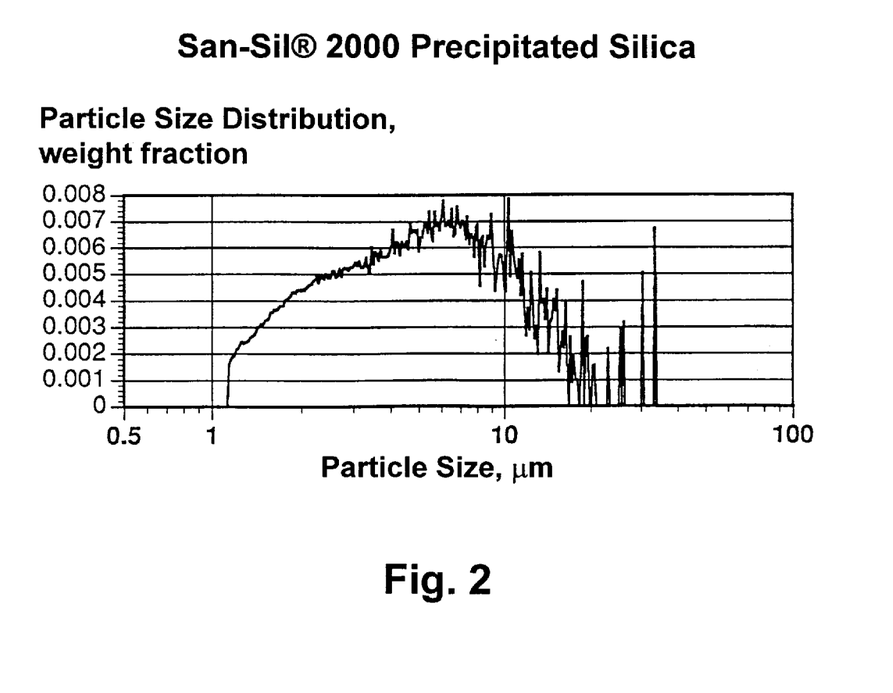
Figure 3:
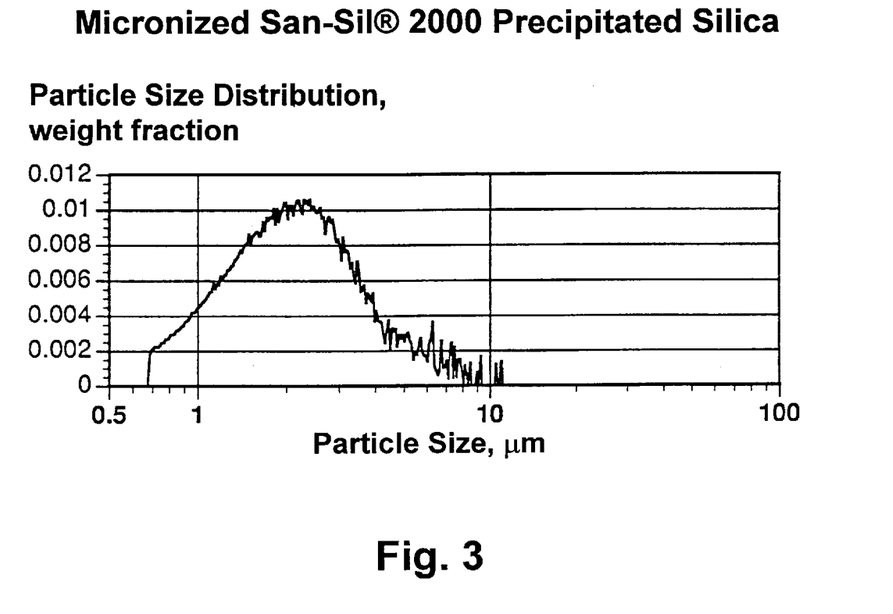
Figure 4:
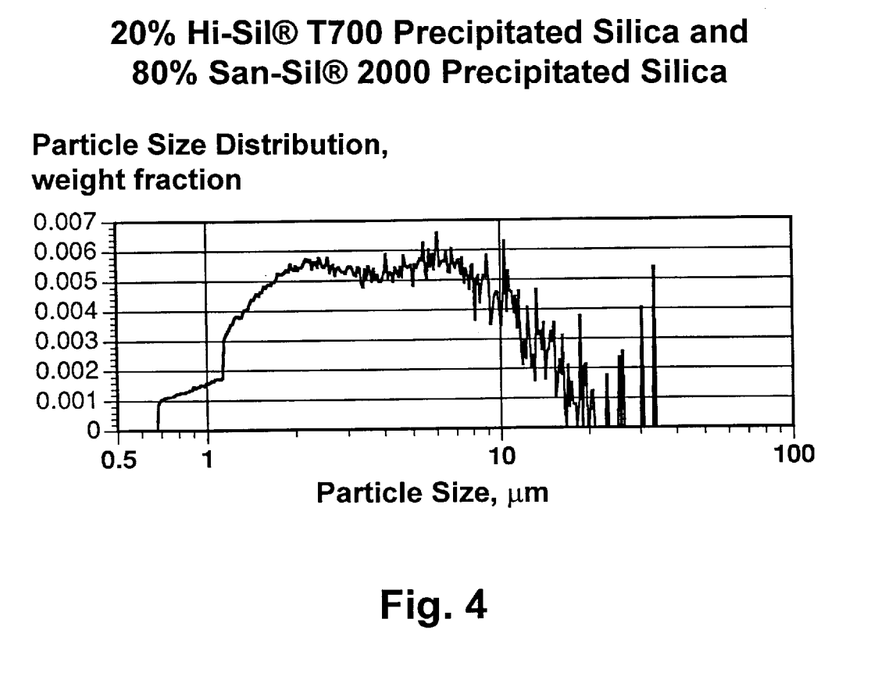
FIGS. 4 and 5 show calculated particle size distribution histograms of various composite particulate amorphous precipitated silicas.
Figure 5:
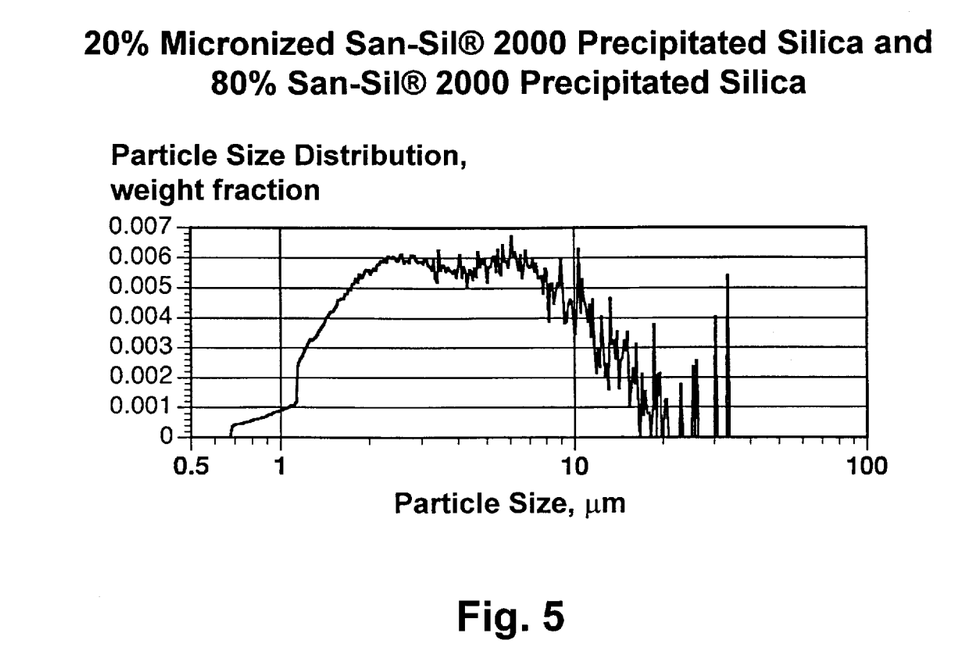

Referring now in greater detail to the drawings, FIG. 1 is a measured particle size distribution histogram of Hi-Sil® T700 amorphous precipitated silica showing a single mode at 1.7 micrometers. FIG. 2 is a measured particle size distribution histogram of San-Sil® 2000 amorphous precipitated silica showing a single mode at 5.2 micrometers. FIG. 3 is a measured particle size distribution histogram of micronized San-Sil® 2000 amorphous precipitated silica showing a single mode at 2.1 micrometers. FIG. 4 is a calculated particle size distribution histogram of a mixture of 20 percent by weight Hi-Sil® T700 amorphous precipitated silica and 80 percent by weight San-Sil® 2000 amorphous precipitated silica. The calculated histogram shows two modes at approximately 2 micrometers and approximately 6 micrometers, respectively, and it shows a very small difference in frequencies (viz., weight fractions) of the particle sizes at the modes. FIG. 5 is a calculated particle size distribution histogram of a mixture of 20 percent by weight micronized San-Sil® 2000 amorphous precipitated silica and 80 percent by weight San-Sil® 2000 amorphous precipitated silica. The calculated histogram shows two modes at approximately 2 micrometers and approximately 6 micrometers, respectively, and it shows a very small difference in frequencies of particle sizes at the modes.

The amount of the particulate amorphous precipitated silica in the coating composition may vary widely. Usually the particulate amorphous precipitated silica constitutes from 3 to 35 percent by weight of the coating composition. Frequently the particulate amorphous precipitated silica constitutes from 10 to 30 percent by weight of the coating composition. From 15 to 25 percent by weight is preferred.

The water-soluble organic polymeric binder is a water-soluble organic polymer or a mixture of water-soluble organic polymers. Many water-soluble organic polymers are suitable as the binder. Examples of water-soluble organic polymers include, but are not limited to, water-soluble cellulose ether, water-soluble poly(vinyl alcohol), water-soluble poly(vinyl alkyl ether), water-soluble poly (vinyl pyrrolidone), water-soluble poly(ethylenimine), water-soluble vinyl pyrrolidone/vinyl acetate copolymer, water-soluble quaternized vinyl pyrrolidone/dialkylaminoethyl methacrylate, copolymer, and mixtures of at least two thereof.

The water-soluble cellulose ethers constitute an especially useful class of water-soluble organic polymeric binders. Many of the water-soluble cellulose ethers are also excellent water retention agents. Water-soluble cellulose ether may be used alone or in admixture with one or more other water-soluble organic polymers. Examples of the water-soluble cellulose ethers include, but are not limited to, water-soluble methylcellulose [CAS 9004-67-5], water-soluble carboxymethylcellulose, water-soluble sodium carboxymethylcellulose [CAS 9004-32-4], water-soluble ethylmethylcellulose, water-soluble hydroxyethylmethylcellulose [CAS 9032-42-2], water-soluble hydroxypropylmethylcellulose [CAS 9004-65-3], water-soluble hydroxyethylcellulose [CAS 9004-62-0], water-soluble ethylhydroxyethylcellulose, water-soluble sodium carboxymethylhydroxyethylcellulose, water-soluble hydroxypropylcellulose [CAS 9004-64-2], water-soluble hydroxybutylcellulose [CAS 37208-08-5], water-soluble hydroxybutylmethylcellulose [CAS 9041-56-9], and mixtures of at least two thereof. Water-soluble sodium carboxymethylcellulose is preferred.

Another preferred water-soluble organic polymeric binder is water-soluble poly(vinyl alcohol) [CAS 9002-89-5]. It may be used alone or in admixture with one or more other water-soluble organic polymers.

Water-soluble poly(vinyl alcohol) may be broadly classified as one of two types. The first type is fully hydrolyzed poly(vinyl alcohol) in which less than 1.5 mole percent acetate groups are left on the molecule. The second type is partially hydrolyzed poly(vinyl alcohol) in which from 1.5 to as much as 20 mole percent acetate groups are left on the molecule. The binder may comprise either type or a mixture of both. The partially hydrolyzed poly(vinyl alcohol) is preferred.

The amount of dissolved water-soluble organic polymeric binder in the coating composition may vary widely. Ordinarily the dissolved water-soluble organic polymeric binder constitutes from 2 to 15 percent by weight of the coating composition. Frequently the dissolved water-soluble organic polymeric binder constitutes from 4 to 10 percent by weight of the coating composition. From 5 to 7 percent by weight is preferred.

In most instances the aqueous solvent for the water-soluble binder is water. Organic cosolvents miscible with water may optionally be present when desired.

The amount of aqueous solvent in the coating composition is susceptible to very wide variation. In most cases aqueous solvent constitutes from 50 to 95 percent by weight of the coating composition. Frequently aqueous solvent constitutes from 60 to 86 percent by weight of the coating composition. From 68 to 80 percent by weight is preferred.

A material which may optionally be present in the coating composition is insolubilizer. Insolubilizers are materials which react with functional groups of water-soluble organic polymers and generally function as crosslinking agents. There are many available insolubilizers which may be used. Examples of suitable insolubilizers include, but are not limited to, Curesan® 199 insolubilizer (PPG Industries, Inc., Pittsburgh, Pa.), Curesan® 200 insolubilizer (PPG Industries, Inc.), Sequarez® 700C insolubilizer (Sequa Chemicals, Inc., Chester, S.C.), Sequarez® 700M insolubilizer (Sequa Chemicals, Inc.), Sequarez® 755 insolubilizer (Sequa Chemicals, Inc.), Sequarez® 770 insolubilizer (Sequa Chemicals, Inc.), Berset® 39 insolubilizer (Bercen Inc., Cranston, R.I.), Berset® 47 insolubilizer (Bercen Inc.), Berset® 2185 insolubilizer (Bercen Inc.), and Berset® 2586 insolubilizer (Bercen Inc.)

There are many other materials which may optionally be present in the coating composition. These include such materials as lubricants, waxes, antioxidants, organic solvents, mordants, lakes, and other pigments. The listing of such materials is by no means exhaustive. These and other ingredients may be employed in their customary amounts for their customary purposes so long as they do not seriously interfere with good coating composition formulating practice.

The viscosities of the coating compositions of the invention may vary considerably. It is desirable, but not necessary, for the Brookfield Viscosity at 40° C. and 20 revolutions per minute (rpm) to be less than 5 pascal-seconds (Pa.s). Frequently the Brookfield Viscosity at 40° C. and 20 rpm is less than 2 Pa.s. Preferably the Brookfield Viscosity at 40° C. and 20 rpm is less than 1 Pa.s. Similarly it is desirable for the Brookfield Viscosity at 40° C. and 100 rpm to be less than 1 Pa.s. Often the Brookfield Viscosity at 40° C. and 100 rpm is less than 0.8 Pa.s. Preferably the Brookfield Viscosity at 40° C. and 100 rpm is less than 0.6 Pa.s. As used herein, the Brookfield Viscosities are determined in accordance with TAPPI Standard T648 om-88.

In most cases coatings characterized by improved (i.e., higher) print densities are obtained from coating compositions containing pigments which impart high viscosities to the coating compositions. It has been surprisingly discovered that in many instances coating compositions having low viscosities which provide coatings of high print density can, all other factors being equal, be obtained by a judicious choice of the relative proportions of the particular constituent particulate amorphous precipitated silicas having differing measured unimodal particle size distributions which are mixed to form the composite particulate amorphous precipitated silica having a calculated multimodal particle size distribution. Such proportions can be ascertained empirically by simple, routine testing which is well within the ordinary skill of the art. As used herein print density is determined using a Macbeth Answer II Reflection Densitometer Model No. RD-922 (Macbeth Division of Kollmorgen Corporation, Newburgh, N.Y.) in accordance with the accompanying operating manual.

The coating compositions are generally applied to paper using substantially any technique known to the art. These include spraying, curtain coating, dipping, rod coating, blade coating, roller application, size press, printing, brushing, drawing, and extrusion. The coating is then formed by removing the aqueous solvent from the applied coating composition. This may be accomplished by any conventional drying technique. Coating composition may be applied once or a multiplicity of times. When the coating composition is applied a multiplicity of times, the applied coating is usually but not necessarily dried, either partially or totally, between coating applications. Once the coating composition has been applied to the paper, the aqueous solvent is substantially removed, usually by drying.

After the coating has been substantially dried, the coated paper may optionally calendered. In most cases calendering is accomplished between two rolls. Preferably, but not necessarily, the roll contacting the coating of the coated paper is a metal-surfaced roll. The other roll is preferably, but not necessarily, surfaced with a somewhat resilient material such as an elastomer of medium hardness. When calendering is employed, the roll temperature may be widely varied, but usually the roll temperature is in the range of from 20° C. to 100° C. Often the roll temperature is in the range of from 30° C. to 80° C. From 40° C. to 60° C. is preferred. Similarly, the force per unit length of the nip may be widely varied. Frequently the force per unit length of the nip is in the range of from 85 to 350 kilonewtons per meter (kN/m). In many instances the force per unit length of the nip is in the range of from 120 to 275 kN/m. Preferably it is in the range of from 155 to 200 kN/m.

The gloss of the coated paper may vary widely. Although lower glosses are acceptable for many purposes, it is preferred that the gloss be at least 20. As used herein gloss is determined according to TAPPI Standard T480 om-92.

In the composition of the third embodiment of the invention, the presence of aqueous solvent for the binder is optional. When present, the amount of aqueous solvent in the composition may be very widely varied. In the broadest sense, the minimum amount may be zero while the maximum amount is not limited by theory, but by practical considerations such as cost and convenience.

When aqueous solvent for the binder is present but at a lower concentration than that of a coating composition, the composition of the third embodiment of the invention is a concentrate which may later be diluted with additional aqueous solvent to form a coating composition.

In its neat form, that is, aqueous solvent being substantially absent, the composition of the third embodiment of the invention may be a concentrate which may later be diluted with aqueous solvent for the binder to form a coating composition, or it may be the coating itself.

The particulate amorphous precipitated silica to water-soluble organic polymeric binder weight ratio in the composition of the third embodiment of the invention may vary widely, but usually it is in the range of from 0.2:1 to 17.5:1. Frequently the weight ratio is in the range of from 1:1 to 7.5:1. Preferably the weight ratio is in the range of from 2.1:1 to 5:1.

The amount of the particulate amorphous silica in the composition of the third embodiment of the invention may vary widely. Usually the particulate amorphous silica constitutes from 1 to 95 percent by weight of the composition of the third embodiment of the invention. Frequently the particulate amorphous silica constitutes from 5 to 88 percent by weight of the composition of the third embodiment of the invention. From 10 to 83 percent by weight is preferred. When the composition of the third embodiment of the invention is a neat composition, the particulate amorphous silica ordinarily constitutes from 17 to 95 percent by weight of the neat composition. Often the particulate amorphous silica constitutes from 50 to 88 percent by weight of the neat composition. From 68 to 83 percent by weight of the neat composition is preferred.

The coating compositions and concentrate compositions of the invention are usually prepared by simply admixing the various ingredients. The ingredients may be mixed in any order, but it is preferred to mix the dry ingredients together before mixing with liquid. Although the mixing of liquid and solids is usually accomplished at room temperature, elevated temperatures are sometimes used. The maximum temperature which is usable depends upon the heat stability of the ingredients.

The coated paper of the present invention may be printed with a wide variety of printing inks using a wide variety of printing processes. Both the printing inks and the printing processes are themselves conventional.

A printing process that is especially useful for printing on the coated paper of the invention is ink-jet printing.

Another class of printing processes that can be used is typographic printing where ink is placed on macroscopically raised areas of a printing plate. Examples of typographic printing processes include rubber-stamp printing, letterpress printing, flexography, and letterset printing which is also known as dry offset printing and as offset letterpress printing.

Another class of printing suitable for use is intaglio printing, also known as gravure printing, where ink is placed on depressed areas of a printing plate.

Yet another class of printing processes suitable for use is planographic printing where ink is placed on localized regions of a printing plate that is either smooth or contains only microscopically raised areas. A subclass of particular interest is lithography, which includes several variations. Conventional lithography uses oil-based inks while reverse lithography uses water-based inks. In direct lithography (whether conventional or reverse), printing ink is applied to the substrate directly from the lithographic printing plate. In offset lithography (whether conventional or reverse), the printing ink is transferred first from the lithographic printing plate to a printing blanket and then from the printing blanket to the substrate. Other types of planographic printing include collotype printing, autotype printing, hectograph printing, laser printing, and xerography.

Another class of printing processes that can be used is stencil printing, including screen printing and mimeograph printing.

Various miscellaneous printing processes that can be used include typewriting and dot matrix printing, both of which may be considered as typographic in principle.

The coated paper is suitable for line printing, halftone printing, and continuous tone printing.

There is a wide variety of systems for classifying inks depending upon which similarities and differences it is desired to emphasize. Most inks used for printing are liquids or pastes, that is, the vehicle before drying contains a liquid.

There are a few exceptions such as xerographic printing ink also known as toner, which is dry. Oil based and most organic solvent based inks are not compatible with water, whereas water based inks are not ordinarily compatible with oil. Inks usually dry by evaporation of liquid, by absorption of liquid into the substrate, by crosslinking of the binder, by cooling, or by a combination of two or more of these. Other systems of classification are based on the type of binder, such as rubber-based, drying oil based, non-drying oil based, natural resin-based, gilsonite-based, asphaltic-based, synthetic resin-based, and the like. Yet another classification system is based upon viscosity of the ink. Still another is based upon the types of colorant which may be present, such as pigment-based, toner-based, dye-based, pigment and dye based, clear, and the like. Other systems are based upon the printing processes employed for deposition of the ink on the substrate.

In keeping with customary usage, the term "printing ink" is used herein with reference to the ink composition employed in printing and with reference to the printed composition on the substrate, whether before drying or after drying, partial drying, or hardening. The correct usage will be obvious from the context or expressly stated.

The invention is further described in conjunction with the following examples which are to be considered illustrative rather than limiting, and in which all parts are parts by weight and all percentages are percentages by weight unless otherwise specified.

EXAMPLE 1

In this Example the identities (viz., A, B, C, D, and E) of the coating compositions, the dried coatings, and the coated papers correspond to the identities of the silica they contain.

Silica A was formed by admixing 80 parts of San-Sil® 2000 precipitated silica and 20 parts of micronized San-Sil® 2000 precipitated silica.

Silica B was formed by admixing 20 parts of San-Sil® 2000 precipitated silica and 80 parts of micronized San-Sil® 2000 precipitated silica.

Silica C consisted of 100 parts of the micronized San-Sil® 2000 precipitated silica.

Silica D consisted of 100 parts of the San-Sil® 2000 precipitated silica.

Silica E was formed by admixing 80 parts of FK 310 precipitated silica (Degussa Corporation, Ridgefield Park, N.J.) and 20 parts Aerosil® MOX 170 fumed silica (Degussa Corporation).

Five coating compositions were prepared by admixing 100 parts of one of the above silicas, 30 parts Airvol® 205S poly(vinyl alcohol) (Air Products and Chemicals, Inc., Allentown, Pa.), 1 part of Curesan® 199 insolubilizer (PPG Industries, Inc., Pittsburgh, Pa.), 0.3 part of Hercules® 7HOF carboxymethylcellulose, sodium salt (Hercules Incorporated, Wilmington, Del.), and 394 parts of water. The Brookfield Viscosity of each coating composition was determined. The results are shown in Table 1.

TABLE 1

| Coating Composition | Brookfield Visc., Pa · s | |
|---|---|---|
| | 20 rpm | 100 rpm |
| A | 0.70 | 0.46 |
| B | 14.50 | 3.60 |

TABLE 1-continued

| Coating Composition | Brookfield Visc., Pa · s | |
|---|---|---|
| | 20 rpm | 100 rpm |
| C | 10.50 | 3.30 |
| D | 0.25 | 0.15 |
| E | 0.60 | 0.21 |

Each coating composition was applied to No. 1. Merchant Grade basestock paper substrate using a No. 18 wire-wound Meyer rod and dried on a photographic drier drum. The dried coatings on the coated papers were tested for gloss. The results of testing are shown in Table 2.

TABLE 2

| Coating | Gloss |
|---|---|
| A | 21.3 |
| B | 22.4 |
| C | 20.8 |
| D | 15.8 |
| E | 16.9 |

The coated papers were printed on the coating side using four-color ink-jet printers and the inks recommended by the printer manufacturer. The printed papers were then tested for print density. A difference of 0.05 in print densities is discernible by the trained eye. The resolutions of the printers in dots per inch (dpi) and the results of testing are shown in Tables 3, 4, and 5.

TABLE 3

Printer 1, 720 dpi

| Coated Paper | Print Density | | | |
|---|---|---|---|---|
| | Black | Cyan | Magenta | Yellow |
| A | 1.7 | 1.69 | 1.32 | 0.86 |
| B | 1.73 | 1.62 | 1.3 | 0.84 |
| C | 1.76 | 1.72 | 1.38 | 0.85 |
| D | 1.64 | 1.64 | 1.28 | 0.82 |
| E | 1.61 | 1.56 | 1.24 | 0.79 |

TABLE 4

Printer 2, 300 dpi

| Coated Paper | Print Density | | | |
|---|---|---|---|---|
| | Black | Cyan | Magenta | Yellow |
| A | 1.02 | 1.58 | 1.08 | 0.91 |
| B | 1.11 | 1.58 | 1.08 | 0.92 |
| C | 1.06 | 1.54 | 1.06 | 0.92 |
| D | 0.96 | 1.49 | 1.03 | 0.9 |
| E | 0.94 | 1.47 | 1.02 | 0.87 |

TABLE 5

Printer 3, 300 dpi

| Coated Paper | Print Density | | | |
|---|---|---|---|---|
| | Black | Cyan | Magenta | Yellow |
| A | 0.97 | 1.53 | 1.07 | 0.9 |
| B | 0.87 | 1.6 | 1.13 | 0.95 |
| C | 0.93 | 1.48 | 1.09 | 0.93 |
| D | 0.91 | 1.47 | 1.06 | 0.89 |
| E | 0.82 | 1.29 | 0.92 | 0.86 |

EXAMPLE 2

A series of coating compositions was prepared in the general manner of Example 1 using the same materials in the same proportions except that San-Sil® 2000 precipitated silica (which is unmicronized) and micronized San-Sil® 2000 precipitated silica were employed in various relative proportions. The Brookfield Viscosity of each coating composition was determined. The relative proportions of unmicronized silica and micronized silica and the results of the viscosity determinations are shown in Table 6.

TABLE 6

| Percent of Total Silica | | Brookfield Viscosity, Pa · s | |
|---|---|---|---|
| Unmicronized | Micronized | 20 rpm | 100 rpm |
| 100 | 0 | 0.260 | 0.196 |
| 90 | 10 | 0.300 | 0.212 |
| 80 | 20 | 0.380 | 0.240 |
| 70 | 30 | 1.200 | 0.320 |
| 60 | 40 | 1.400 | 0.480 |
| 50 | 50 | 3.200 | 1.060 |
| 40 | 60 | 4.900 | 1.460 |
| 30 | 70 | 8.000 | 1.960 |
| 20 | 80 | 9.200 | 2.400 |
| 10 | 90 | 10.000 | 3.100 |
| 0 | 100 | 10.500 | 3.900 |

EXAMPLE 3

In this Example the identities (viz., 1, 2, 3, 4, 5, 6, and 7) of the coated papers correspond to the identities of the coating compositions from which they were formed.

A series of coating compositions was prepared in the general manner of Example 1 using the same materials in the same proportions except that San-Sil® 2000 precipitated silica and Hi-Sil® T700 precipitated silica were employed in various relative proportions. The Brookfield Viscosity of each coating composition was determined. The relative proportions of the two silicas and the results of the viscosity determinations are shown in Table 7.

TABLE 7

| Coating Composition | Percent of Total Silica | | Brookfield Visc., Pa · s | |
|---|---|---|---|---|
| | San-Sil® 2000 | Hi-Sil® T700 | 20 rpm | 100 rpm |
| 1 | 100 | 0 | 4.000 | 1.200 |
| 2 | 92 | 8 | 14.000 | 2.680 |
| 3 | 84 | 16 | 10.000 | 1.760 |
| 4 | 80 | 20 | 2.100 | 0.610 |
| 5 | 76 | 24 | 0.270 | 0.348 |

TABLE 7-continued

| Coating Composition | Percent of Total Silica | | Brookfield Visc., Pa · s | |
|---|---|---|---|---|
| | San-Sil® 2000 | Hi-Sil® T700 | 20 rpm | 100 rpm |
| 6 | 68 | 32 | 6.400 | 1.340 |
| 7 | 60 | 40 | 0.600 | 0.300 |

Each coating composition was applied to No. 1. Merchant Grade basestock paper substrate using a No. 18 wire-wound Meyer rod and dried on a photographic drier drum. The coated papers were printed on the coating side using a four-color ink-jet printer and the inks recommended by the printer manufacturer. The printed papers were then tested for print density. A difference of 0.05 in print densities is discernible by the trained eye. The results of testing are shown in Table 8.

TABLE 8

| Coated Paper | Print Density | | | |
|---|---|---|---|---|
| | Black | Cyan | Magenta | Yellow |
| 1 | 1.17 | 1.63 | 1.18 | 0.95 |
| 2 | 1.18 | 1.68 | 1.24 | 0.97 |
| 3 | 1.21 | 1.71 | 1.22 | 0.99 |
| 4 | 1.20 | 1.73 | 1.23 | 0.97 |
| 5 | 1.10 | 1.64 | 1.16 | 0.95 |
| 6 | 1.19 | 1.70 | 1.22 | 0.99 |
| 7 | 1.12 | 1.70 | 1.17 | 0.95 |

Although the present invention has been described with reference to specific details of certain embodiments thereof, it is not intended that such details should be regarded as limitations upon the scope of the invention except insofar as they are included in the accompanying claims.

We claim:

1. Coated paper comprising a paper substrate having a coating on at least one side thereof wherein said coating comprises:
    (a) composite particulate amorphous precipitated silica having a calculated multimodal particle size distribution wherein the particle sizes at the modes are less than 10 micrometers; and
    (b) water-soluble organic polymeric binder.

2. The coated paper of claim 1 wherein the difference between the particle sizes at the modes is least 1 micrometer.

3. The coated paper of claim 1 wherein the calculated multimodal particle size distribution is bimodal.

4. The coated paper of claim 1 wherein said water-soluble organic polymeric binder comprises water-soluble sodium carboxymethylcellulose and water-soluble poly(vinyl alcohol).

5. The coated paper of claim 1 wherein:
    (a) said composite particulate amorphous precipitated silica:
        (i) has a surface area on a coating-free and impregnant-free basis of from 50 to 600 square meters per gram, a pore diameter at the maximum of the volume pore size distribution function on a coating-free and impregnant-free basis of from 7 to 100 nanometers, and a total intruded volume on a coating-free and impregnant-free basis of from 0.5 to 5 cubic centimeters per gram, and
        (ii) constitutes from 17 to 95 percent by weight of the coating; and (b) the particulate amorphous precipitated silica to water-soluble organic polymeric binder weight ratio is in the range of from 0.2:1 to 17.5:1.

6. The coated paper of claim 1 wherein:
(a) said composite particulate amorphous precipitated silica:
   (i) consists of a mixture of two constituent particulate reinforced amorphous precipitated silicas of the same type, each having a measured unimodal particle size distribution in which the particle size at its mode is less than 10 micrometers and is different from the particle size at the mode of the other constituent particulate reinforced amorphous precipitated silica,
   (ii) has a surface area on a coating-free and impregnant-free basis of from 220 to 270 square meters per gram, a pore diameter at the maximum of the volume pore size distribution function on a coating-free and impregnant-free basis of from 13 to 18 nanometers, and a total intruded volume on a coating-free and impregnant-free basis of from 3 to 4.4 cubic centimeters per gram, and
   (iii) constitutes from 68 to 83 percent by weight of the coating; and
(b) said water-soluble organic polymeric binder comprises water-soluble sodium carboxymethylcellulose and water-soluble poly(vinyl alcohol);
(c) the particulate amorphous precipitated silica to water-soluble organic polymeric binder weight ratio is in the range of from 2.1:1 to 5:1; and
(d) the calculated multimodal particle size distribution is bimodal.

* * * * *